April 14, 1931.  J. W. MORTON ET AL  1,801,101
METHOD AND APPARATUS FOR WHISKING LIQUID OR SEMILIQUID SUBSTANCES
Filed Oct. 24, 1928  4 Sheets-Sheet 1
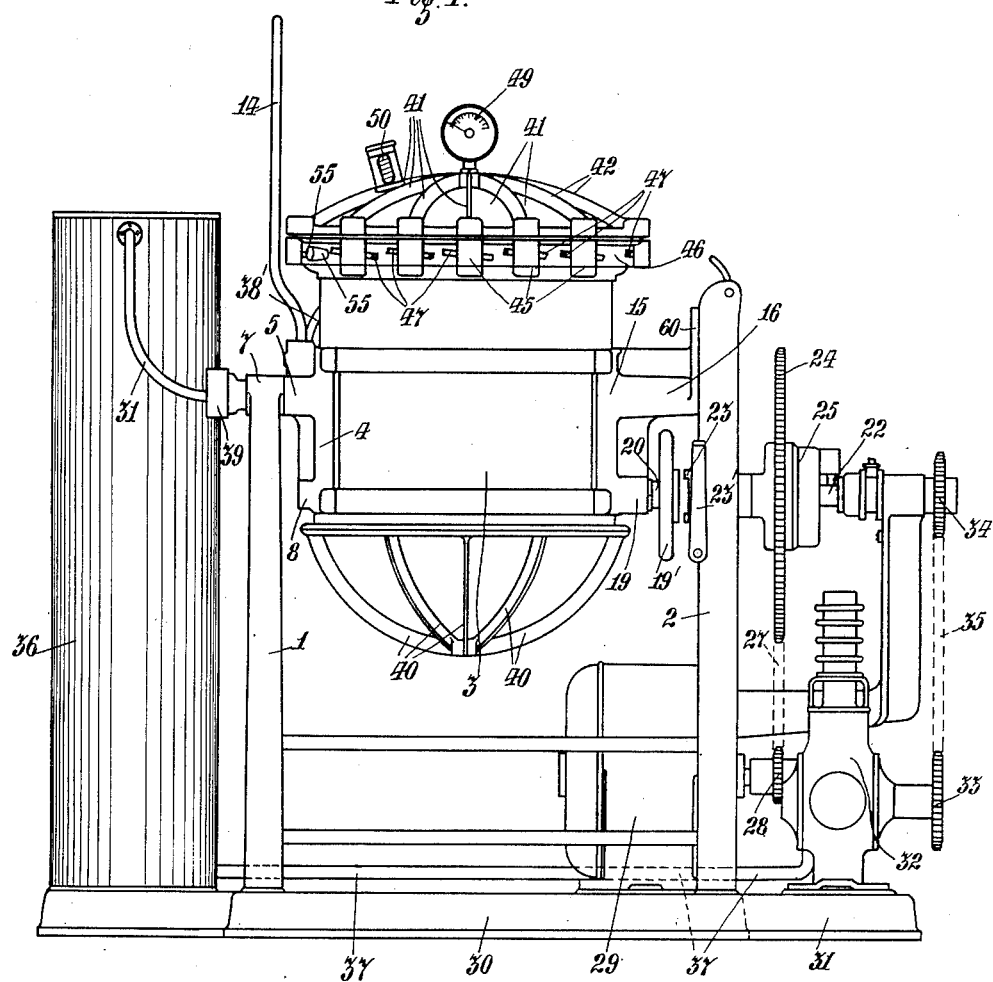

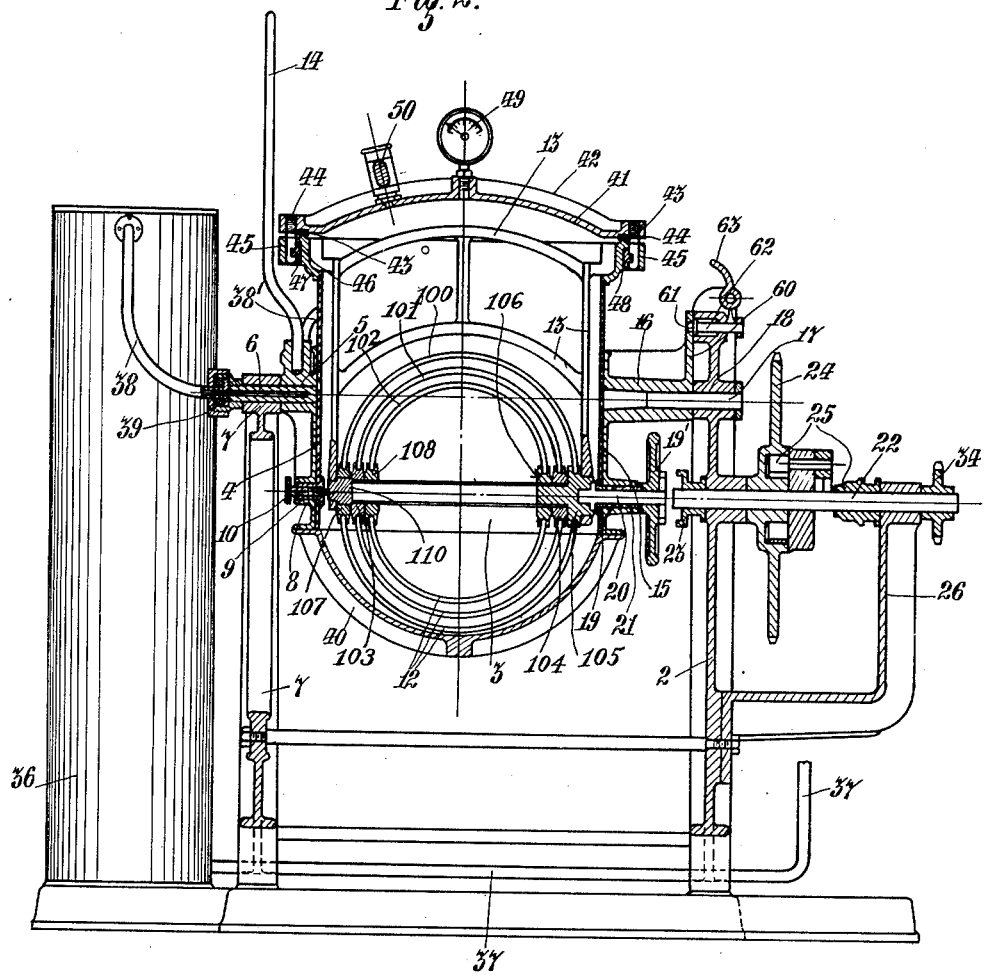

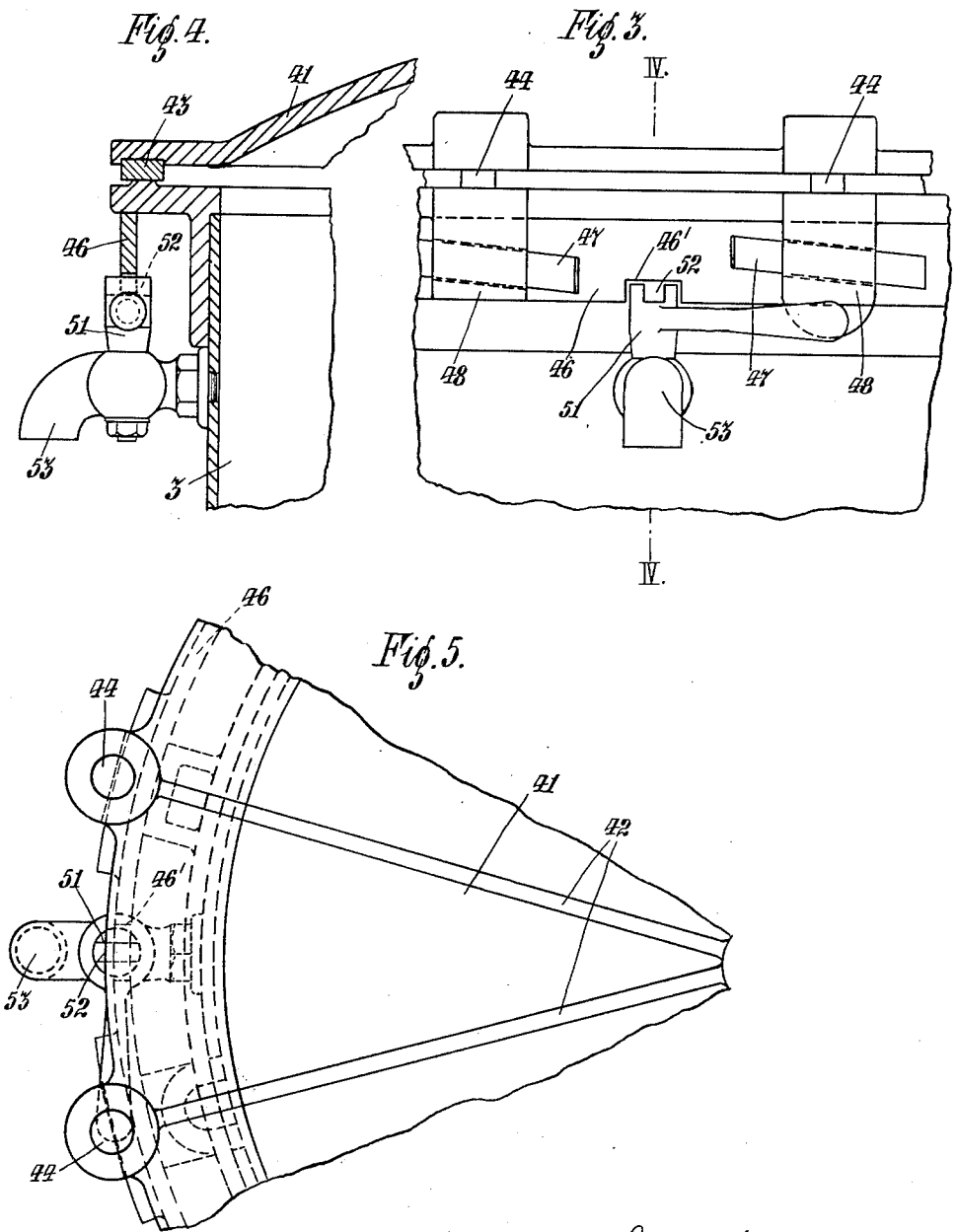

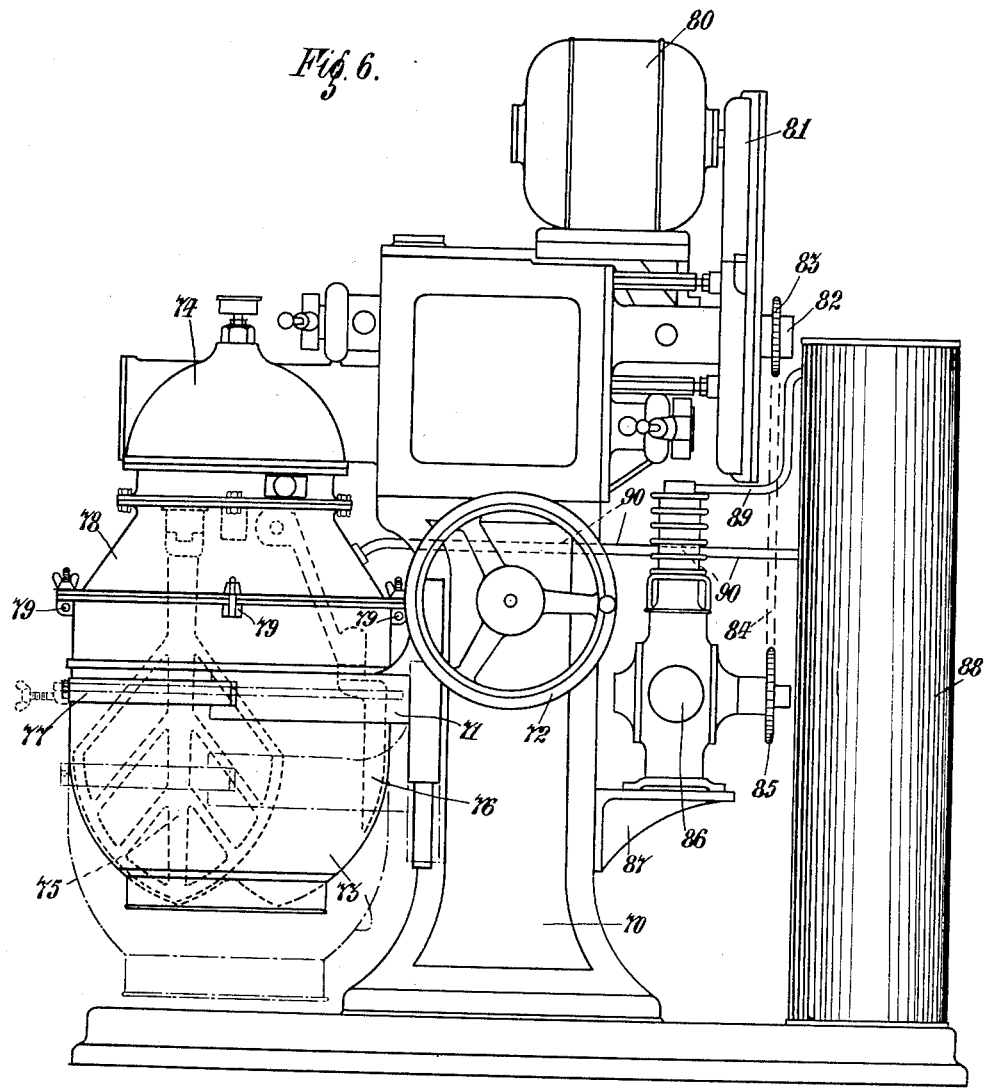

Patented Apr. 14, 1931

1,801,101

UNITED STATES PATENT OFFICE

JOHN WADDELL MORTON, OF LONDON, ENGLAND, AND JAMES MORTON, OF WISHAW, SCOTLAND; WILLIAM MORTON, EXECUTOR OF SAID JAMES MORTON, DECEASED, ASSIGNOR TO WILLIAM MORTON AND ROBERT HENRY MORTON, BOTH OF WISHAW, LANARKSHIRE, SCOTLAND

METHOD AND APPARATUS FOR WHISKING LIQUID OR SEMILIQUID SUBSTANCES

Application filed October 24, 1928, Serial No. 314,753, and in Great Britain June 8, 1928.

In the preparation of products in the confectionery art two classes of constituents are used, namely the constituents which require to be mixed and beaten or whisked (that is, beaten or whipped lightly, as for instance, to whisk eggs into a froth) and which we will call for convenience the liquid or semi-liquid constituents, but they may include granular or melted sugar, and those constituents such as flour which are mixed with the beaten or whisked constituents, after preparation thereof, to form dough, batter and the like.

This invention relates to treatment of the liquid or semi-liquid constituents as defined above and has for its object to expedite the beating or whisking and to increase the volume of material beaten in the actual beating or whisking operation.

A further object is to lighten the product, which is desirable in those used in the confectionery art.

In order that this invention can be clearly understood and readily carried into practice, two embodiments of the apparatus will now be described, simply by way of example, reference being made to the accompanying drawing, wherein:—

Fig. 1 is an elevation of one embodiment.
Fig. 2 is a sectional elevation thereof.
Figs. 3, 4 and 5 show a fragmentary side elevation, a sectional view on line IV—IV on Fig. 3 and a plan view respectively of the container drawn to an enlarged scale.

Fig. 6 is a side elevation of a further embodiment.

In Figs. 1-5 the standards 1 and 2 are spaced apart and carry between them the container 3. At one side of the container is fixed a side plate 4 having, above the middle of the container, a bearing 5 for a trunnion 6 which passes through a bearing 7 in the standard 1. Below the bearing 5, the plate is provided with a boss 8 carrying a fixed bearing bush 9 tapped to receive a thumb screw 10 which serves detachably to secure the beating and mixing device proper 12. This beating and mixing device is mounted on the frame 13. At the upper end, this plate 4 is provided with an operating handle 14 for tilting the container.

At the opposite side of the container, is fixed a plate 15 having, above the middle of the container, an extended trunnion bearing 16 for the trunnion 17 passing through the bearing 18 in the standard 2.

Beneath the trunnion bearing 16 on the plate is a bearing 19 for the driving spindle 20 which is rotatably mounted in the bush 21. On the outer end of the spindle 20 is fixed one part 19' of a dog clutch, and the inner end extends into the container and is made to carry the proximate end of the beating and mixing device or whisk 12. The whisk 12 comprises a multiplicity of specially related whisking members, such as metallic wires or rods indicated at 100, 101 and 102, at least one of said whisking members being rotatably driven with respect to another of the whisking members. The wire 101 is carried at one end in a stationary flanged member 103 which is secured in the frame or hanger 13. The opposite ends of the wire members 101 enter the hollow flanged member 104, which is concentrically positioned about shaft 20 in such manner that shaft 20 is free to rotate through the flanged member 104, the wire members 101 thereby remaining stationary. The shaft 20 carries the wire members 100 and 102 by means of flanged members 105 and 106 at one end and flanged members 107 and 108 at the opposite end. The flanged member 106 is keyed to the shaft 20 to insure the simultaneous rotation of wire members 100 and 102. Flanged member 108 is keyed to the shaft 120 and revolves with the shaft. The flanged member 107 is free to revolve about the stationary flanged member 103, thereby enabling wire member 100 to rotate with respect to wire member 101. The shaft 20 fits into a socket 110 in the stationary flanged member 103. By the simultaneous rotation of wire members 100 and 102 on each side of wire member 101, we obtain a whisking effect throughout the contents of the container. By the term whisking we mean beating or whipping into a light fluff or into a mixture containing a very large percentage of air. That is to say, when the contents of the container are properly whisked, the volume thereof has expanded to substantially double or more than its original volume. This thorough whisking is brought about at a pressure substantially greater than atmospheric. On the standard 2, in alignment with the driving spindle 20 is a driving shaft 22 having, on its inner end, the sliding member or part 23 of a dog clutch, which, as usual, is slidably but non-rotatably fixed to the shaft. A chain sprocket wheel 24 is rotatably mounted on the shaft 22 and, is adapted to be clutched to and declutched from the shaft by an internal expanding clutch 25, the outer end of the shaft being supported by a bracket 26. The sprocket wheel 24 is driven by the chain 27 from a chain sprocket wheel 28 on the electric motor 29. It will be understood that instead of the motor any other prime mover may be used, and, further, that in place of the whole driving mechanism a fast and loose pulley may be employed.

The motor 29 is mounted on a base plate 30 to which the standards 1 and 2 are fixed. On an extension 31 of the base plate 39 is a compressor 32, which is driven through the chain sprockets 33 and 34 and chain 35 from the shaft 22, and this compressor supplies air under pressure to the receiver 36 through the conduit 37, and the receiver, in turn, supplies air under pressure through the pipe 38, by way of trunnions 6 and pipe 38' to the container 3. An air-tight joint 39 is provided between the pipe 38 and trunnions 6.

The container 3, which is made sufficiently strong to withstand the pressure, is provided with strengthening webs 40 and with a detachable lid 41, also, provided with strengthening webs 42. The lid is provided with a packing ring 43 and with a series of studs 44 adapted to engage in the hollow bosses 45 on top of the container and to engage with a locking ring 46 having projections 47 which engage with recesses 48 in the studs on the lid, and serve, on rotation of the locking ring 46, to draw the lid tightly on the top of the container, and thus form an air-tight closure therefor. Handles, only one of which marked 55 is shown, the other being at the back of the lid diametrically opposite that shown, are provided for rotating the locking ring. The lid is provided with a pressure gauge 49, a safety valve 50 and with a locking device 51 projecting into a recess 46' in the locking ring 46 and having a slot 52 which in one position thereof allows the ring to move but in the other position prevents movement of the locking ring, this device forming part of a cock 53, all being so arranged that when the lid is in position and the cock closed the lid is locked and can not be removed, and when unlocked the cock is opened to release the pressure.

When the member 23 is disengaged the container can be tipped so as to discharge its contents through the open top thereof. The extended trunnion bearing 16 has a flange 60 with two spaced holes, only one of which is shown and marked 61, each adapted to receive a spring-pressed locking bolt 62 on the standard 2. One of these holes is engaged by the bolt to fix the container in its normal untilted position and the other is engaged by the bolt to keep it in the tilted position; the bolt being retractable by the lever 63.

In operation the substances are introduced into the container, the beating and mixing device is placed and fixed therein, the cover is placed in position and the locking ring rotated to make it air-tight when the air which is passing under pressure, from the receiver 36 into the container gradually increasing the pressure therein, then the mixing device is started by engaging the clutch member 23 by its handle 23'. After a given time the clutch member 23 is disengaged, the cock is opened to release the pressure and the lid unlocked and removed, whereafter the container can be tilted to discharge its contents. For the purpose of this invention the whisking elements (that is, in this case, the wires or rods indicated at 100, 101, 102) are rotated rapidly, actually about 150 to 200 revolutions per minute, as compared with a speed of 15 or 20 revolutions per minute as ordinarily used in mixing dough and like ingredients in such machines as hitherto used.

The embodiment shown in Fig. 6 comprises a stand 70 having a bracket 71 which can be raised and lowered by mechanism in the stand and operated by the hand wheel 72, and which bracket 71 carries the container 73. The stand has an overhung journal box 74 carrying a mixing and beating device 75 which is given a planetary motion by gearing in said journal box. A scraper 76 is also provided depending from the journal box. The container 73 is removable from the bracket being detachably held in position by the band 77. The journal box is provided with a depending bell-shaped cover 78, fixed thereto, and adapted, when the container is raised to close the open top thereof, the cover and container being clamped together, in an air-tight manner by the nuts and bolts 79. The machine is driven by an electric motor 80 which, through gearing located in the casing 81, drives the shaft 82 constituting the main driving shaft of the machine. By varying the speed of the motor the rate of agitation is varied while the pressure which has been established within the casing is maintained constant. On the shaft 82 is mounted a chain sprocket 83 which, by means of the chain 84, drives the sprocket wheel 85 of an air compressor or pump 86 mounted on a bracket 87. This air compressor or pump supplies air to the receiver 88 through a pipe 89 and the receiver, in turn, supplies such air through the pipe 90 to the cap 78. This embodiment operates in the same manner as the first embodiment.

In mixing sugar and eggs for sponge cakes we have found that air supplied under a pressure of from two to six pounds which is maintained constant during the whisking operation to the interior of the container of the mixing apparatus gives very good results. The mixing is finished in approximately half the time taken for a similar batch when no air under pressure is supplied, the bulk is substantially increased, and the final product is much lighter.

We claim:

1. Beating and mixing apparatus comprising, in combination, an air-tight container, a beating and mixing device in said container comprising a multiplicity of spacially related whisking members, rotatable driving means for driving at least one of said whisking members with respect to another of said whisking members and means operated by said driving means for supplying gas under pressure to said container during the beating and mixing operation whereby the mixing and beating is expedited and the bulk of the mixture increased.

2. Beating and mixing apparatus comprising, in combination, a container mounted on trunnions so as to be tiltable for discharging its contents, standards supporting said trunnions, a beating and mixing device located at a point below said trunnions, a driving spindle for said device extending through one side of the container below said trunnions, driving means for said spindle, means for engaging and disengaging said driving means at the end of the beating and mixing operation so as to allow the container to be tilted, an air-tight cover for said container and means for supplying gas under pressure to said container during the mixing operation whereby the mixing and beating is expedited and the bulk of the mixture increased.

3. Beating and mixing apparatus comprising, in combination, a container mounted on trunnions so as to be tiltable for discharging its contents, standards supporting said trunnions, a beating and mixing device located at a point below said trunnions, a driving spindle for said device extending through one side of the container below said trunnions, driving means for said spindle, means for engaging and disengaging said driving means at the end of the beating and mixing operation so as to allow the container to be tilted, an air-tight cover for said container, means for supplying gas under pressure to said container during the mixing operation, means for releasing said pressure at the end of the mixing operation; and means for preventing the opening of said container until the pressure has been released.

4. Beating and mixing apparatus comprising, in combination, a container having an open top for the introduction of substances to be beaten and mixed, air-tight closing means for the open top of said container, means for supplying gas under pressure to said container, locking means for said air-tight closing means, a pressure release device operated by said locking means adapted to release the pressure when the air-tight closing means is unlocked, a beating and mixing device in said container and means for driving said beating and mixing device.

5. Beating and mixing apparatus comprising, in combination, a container having an open top for the introduction of substances to be beaten and mixed, air-tight closing means for the open top of said container, locking means for said air-tight closing means, pressure release means controlled by said locking means and arranged to be open when the locking device is in its unlocked position and to be closed when the locking device is in its locked position, a beating and mixing device in said container, driving means for driving said device and means operated by said driving means for supplying gas under pressure to said container, to create a pressure therein during the beating and mixing operation whereby the mixing and beating is expedited and the bulk of the mixture increased.

6. Beating and mixing apparatus comprising, in combination, a container having an open top for the introduction of substances to be beaten and mixed, air-tight closing means for the open top of said container, locking means for said airtight closing means, pressure release means controlled by said locking means and arranged to be open when the locking device is in its unlocked position and to be closed when the locking device is in its locked position, a beating and mixing device in said container, driving means for driving said device, a gas receiver, means operated by said driving means for supplying gas under pressure to said receiver and means for supplying gas under pressure from said receiver to the container so as to create a pressure therein during the beating and mixing operation whereby the beating and mixing is expedited and the bulk of the mixture increased.

7. Beating and mixing apparatus comprising, in combination, a container having an open top for the introduction of substances to be beaten and mixed, air-tight closing means for the open top of said container, a beating and mixing device in said container, driving means for driving said device, a gas receiver, means operated by said driving means for supplying gas under pressure to said receiver and means for supplying gas under pressure from said receiver to the container so as to create a pressure therein during the beating and mixing operation whereby the beating and mixing is expedited and the bulk of the mixture increased.

8. The method of beating a relatively large quantity of air into fluid viscous material, such as sugar and eggs, or like mixtures, which consists in completely enclosing the material in a casing confined at a constant pressure substantially greater than atmospheric, violently whisking the material under such pressure to produce a light forth, whereby the volume thereof may be substantially increased under pressure of air within approximately one-half the time required for whisking a similar quantity of material at atmospheric pressure, releasing the pressure and removing the light froth from the casing.

9. The method of beating a relatively large quantity of air into fluid viscous material, such as sugar and eggs, or like mixtures, which consists in completely enclosing the material in a casing, maintaining the material under constant pressure within the casing substantially greater than atmospheric and violently agitating the material at variable speed under said pressure until a relatively large increase in volume is effected, for producing a light froth, releasing the pressure and removing the froth from the casing.

10. The method of beating or whisking a relatively large quantity of air into the liquid or semi-liquid constituents used in the confectionery art such as sugar and eggs in order to form a frothy mass, which consists in completely enclosing the constituents in a casing maintaining the constituents at constant pressure substantially greater than atmospheric, violently whisking the constituent under said pressure until a relatively large increase in volume is effected, reducing the constituents after whisking to atmospheric pressure removing a portion of the casing and removing the constituents in the form of a light frothy mass through the portion of the casing thus removed.

11. The method of treating liquid and semi-liquid constituents used in the confectionery art for forming a frothy material which consists in completely enclosing the liquids or semi-liquids in an air-tight container and whisking said liquids or semi-liquids at variable speed while maintaining said liquids or semi-liquids under substantially constant air pressure to produce a light froth, reducing the pressure to atmospheric and removing the frothy material from the casing.

In testimony whereof we affix our signatures.

JOHN W. MORTON.
JAMES MORTON.